US007139905B2

(12) United States Patent
Filer et al.

(10) Patent No.: US 7,139,905 B2
(45) Date of Patent: Nov. 21, 2006

(54) DYNAMIC ENDIAN SWITCHING

(75) Inventors: Eric P. Filer, Renton, WA (US); Thomas W. Getzinger, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 307 days.

(21) Appl. No.: 10/834,134

(22) Filed: Apr. 29, 2004

(65) Prior Publication Data

US 2005/0251650 A1 Nov. 10, 2005

(51) Int. Cl.
*G06F 7/00* (2006.01)

(52) U.S. Cl. .......................... 712/300; 712/39; 712/43; 712/229

(58) Field of Classification Search ..................... None
See application file for complete search history.

(56) References Cited

U.S. PATENT DOCUMENTS 5,524,245 A * 6/1996 Zarrin et al. ................... 713/2
5,781,763 A 7/1998 Beukema et al.
5,968,164 A * 10/1999 Loen et al. ................. 712/204
6,182,203 B1 * 1/2001 Simar et al. .................. 712/22
6,279,126 B1 * 8/2001 Malik et al. .................. 714/38
6,341,345 B1 1/2002 Auslander et al.
6,629,207 B1 * 9/2003 Yoshioka et al. ........... 711/125
6,895,489 B1 * 5/2005 Qureshi et al. ............. 711/202

OTHER PUBLICATIONS

Atheros Communications Data Sheet, AR2312 Wireless System-on-a-Chip (WiSoC) for 2.4 GHz and 5GHz Wireless LANs, Preliminary Revision Sep. 2003, pp. 1-118, including Index.

* cited by examiner

*Primary Examiner*—Eddie Chan
*Assistant Examiner*—Jacob Petranek
(74) *Attorney, Agent, or Firm*—Banner & Witcoff, Ltd.

(57) ABSTRACT

The dynamic switching of a bi-endian processor between endian modes is described. A device having the bi-endian processor may also have an endian select circuit. The endian select circuit may receive a signal from the processor that determines what the endian-ness should be after the processor resets. Special instruction code may be executed by the processor in both little and big endian modes. The special instruction code may, for instance, cause a processor in a first endian mode to output a signal and reset, while the same instruction code may cause a processor in a second endian mode to neither output the signal nor reset. Instead, the processor in the second endian mode may jump to a new instruction address and proceed with normal processing.

20 Claims, 4 Drawing Sheets

DYNAMIC ENDIAN SWITCHING

FIELD OF THE INVENTION

The present invention is directed to dynamically switching the endian-ness of a processor.

BACKGROUND OF THE INVENTION

Many existing processors are designed to selectably operate in either "big-endian" or "little-endian" mode. These devices are known as "bi-endian" processors. For example, the BCM4702 processor chip, marketed by Broadcom Corporation, is bi-endian and operates in either little-endian mode or big-endian mode depending upon the voltage level applied to a particular one of its EIF_DATA pins when the processor is initialized. In little-endian mode, for a given numerical value, the lowest memory address for the value represents the least significant portion of the value, while the highest memory address for the value represents the most significant portion of the value. For instance, where the value is defined by four bytes, the least significant byte is found in the lowest memory address for that value and the most significant byte is found in the highest memory address for that value. In big-endian mode, the reverse is true; the lowest memory address in the value's address range represents the most significant portion of the value, while the highest memory address in the value's address range represents the least significant portion of the value.

Most computer architectures operate under little-endian mode. For example, most personal computers that use Microsoft WINDOWS brand operating systems operate in little-endian mode. However, some computer architectures use big-endian mode. It is sometimes desirable to be able to switch a device between endian modes so that a different set of software (e.g., a different operating system) may be used in the device. For example, assume that the firmware of a broadband router is running the VxWorks operating system, which uses big-endian mode. It may be desirable to switch the router over to run the Microsoft WINDOWS CE brand operating system, which uses little-endian mode. If the router has a bi-endian processor, then such switching may be performed.

However, in order to switch a bi-endian processor embedded in a device (such as the above-described router) between endian modes, the device power must be turned off, the casing of the device must be opened (usually by the end user) and a physical jumper wire must be reconfigured. By reconfiguring the jumper wire and then reapplying power to the device, the input to the bi-endian processor receives an appropriate signal defining which endian mode to use. Unfortunately, requiring a user to open a device and move a jumper is inconvenient and requires a level of skill that many end users simply do not have. Therefore, a need exists to allow a device having a bi-endian processor to conveniently switch endian modes without necessarily requiring a user to open the device, move a jumper, and/or make any other hardware change to the device.

SUMMARY OF THE INVENTION

Aspects of the present invention are directed to allowing the endian-ness of a device having a bi-endian processor to be dynamically switched without necessarily needing to open the device, move a jumper, and/or make any other hardware change to the device. The device may have an endian select circuit that allows the processor to be dynamically switched between endian modes. The endian select circuit may receive a signal from the processor that determines what the endian-ness should be after the processor resets.

Further aspects of the present invention are directed to special instruction code that can be interpreted in a first endian mode to cause the processor to operate in a first manner, and that can be interpreted in a second endian mode to cause the processor to operate in a second manner. For example, the special instruction code may cause the processor in a first endian mode to output a signal and reset, while the same instruction code may cause the processor in a second endian mode to neither output the signal nor reset. Instead, the processor in the second endian mode may jump to a new instruction address and proceed with normal processing.

These and other aspects of the invention will be apparent upon consideration of the following detailed description of illustrative embodiments.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

Figure 1:
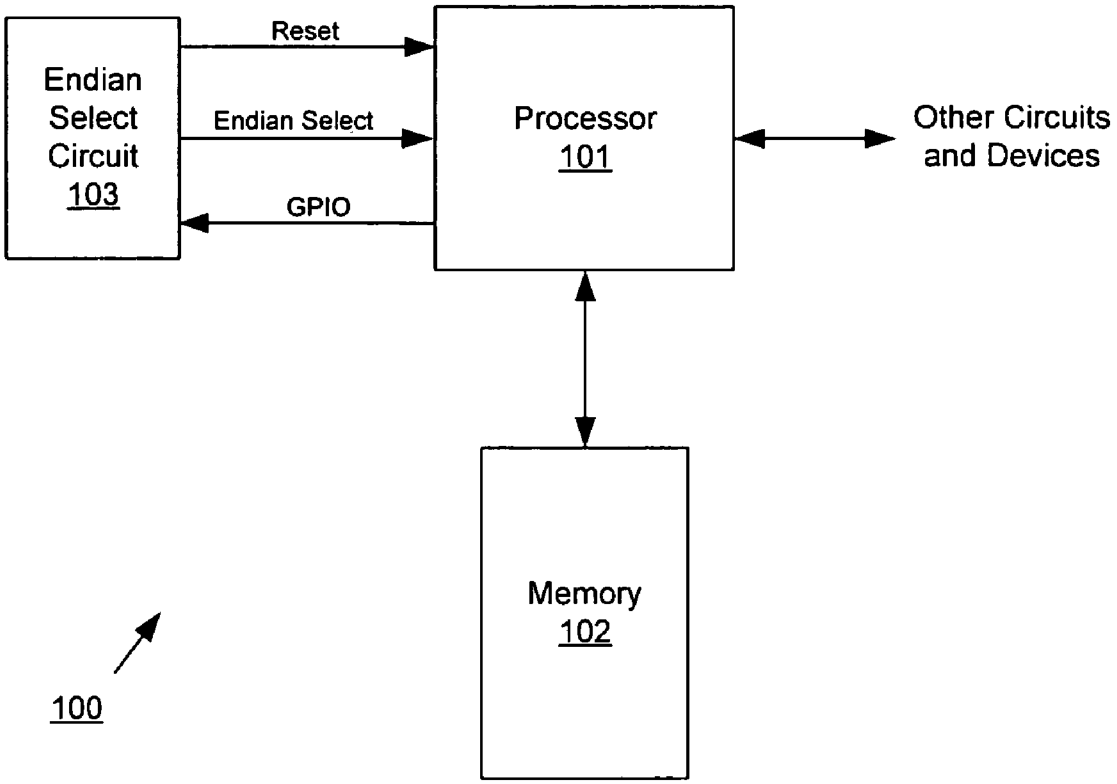
FIG. 1 is a functional block diagram of an illustrative processing device in accordance with aspects of the present invention.

Referring to FIG. 1, a block diagram of an illustrative processing device 100 is shown. The processing device 100 may be any device that processes data, such as, but not limited to, a computer (e.g., a desktop computer, a laptop computer, a tablet computer, a hand-held computer), a networking device (e.g., a router or a gateway), a computer peripheral (e.g., a printer or a scanner), audio/video equipment (e.g., a personal video recorder or stereo equipment), or any other processing device such as a cellular phone or a digital camera. The processing device 100 may include a processor 101, which may be a CPU or other type of processor. The processor 101 may send and receive data to and from memory 102 in the processing device 100, as well as to and from other circuitry in the processing device 100 and/or other devices separate from the processing device 100. For example, where the processing device 100 is a broadband router coupled to a separate personal computer, the broadband router may send and receive data to and from the personal computer.

The memory 102 may be any type of memory or combination of memory types, such as, but not limited to, random-access memory (RAM), read-only memory (ROM), dynamic RAM (DRAM), and/or static RAM (SRAM). The memory 102 may be physically made up of one or more memory integrated circuit chips, and may define a range of memory addresses. Typically, values representing numbers are stored such that each value may be stored in a plurality (often a consecutive series) of memory addresses. For example, it is typical for values to be stored as four-byte values. Depending upon the width of each memory address, a four-byte value may require more than one memory address. For instance, where the memory addresses are each one byte wide (a byte is eight binary bits or two hexadecimal digits), a four-byte value would be stored in four memory addresses (which would typically be consecutive memory addresses).

The processor 101 may be capable of operating in either big-endian mode or little-endian mode. For example, assume that a single value is stored in a range of memory addresses. In little-endian mode, the least significant portion (e.g., byte) of the value is stored in the lowest memory address in the range, while the most significant portion (e.g., byte) is stored in the highest memory address in the range. In big-endian mode, the order of the stored content is reversed; the most significant portion of the value is stored in the lowest memory address in the range, while the least significant portion is stored in the highest memory address in the range. For example, the decimal number 11,162,931, which in hexadecimal is 0x00AA5533, may be stored in the memory 102 in either big-endian mode or little-endian mode as shown in Table 1 (all values in hexadecimals.

TABLE 1

| Address | Little Endian | Big Endian |
|---|---|---|
| 00 | 33 | 00 |
| 01 | 55 | AA |
| 02 | AA | 55 |
| 03 | 00 | 33 |

The endian-ness of a system may be defined at various levels other than among bytes. Little and big endian-ness may be realized at other levels such as within each individual byte and/or among nibbles, half words, words, double words, etc. Many systems uses big endian-ness architecture within a byte and little-endian architecture among bytes, which is the architecture represented by the Little Endian column of Table 1. Most personal computers today have a little-endian architecture among bytes. However, some personal computers, many mainframes, and some other devices have a big-endian architecture among bytes (and also within each byte), such as shown in the Big Endian of Table 1.

To select an endian mode, the processor 101 may have an Endian Select input, which may be made up of one or more pins. For example, where the processor 101 is a BCM4702 processor chip, the processor may have sixteen data pins (e.g., EIF_DATA<0> through EIF_DATA<15>), where one of the pins, EIF_DATA<15>, also operates as an Endian Select pin. When the EIF_DATA<15> pin (in this embodiment) is sampled to be low upon power up, then the BCM4702 chip operates in little-endian mode. When the EIF_DATA<15> pin is sampled to be high upon power up, then the BCM4702 chip operates in big-endian mode. Other bi-endian processors are known. Typically, to switch a bi-endian processor embedded in a device between endian modes, the casing of the device must be opened and a physical jumper wire must be reconfigured. By reconfiguring the jumper wire, the input to the processor receives the appropriate signal defining which endian mode to use.

Figure 2:
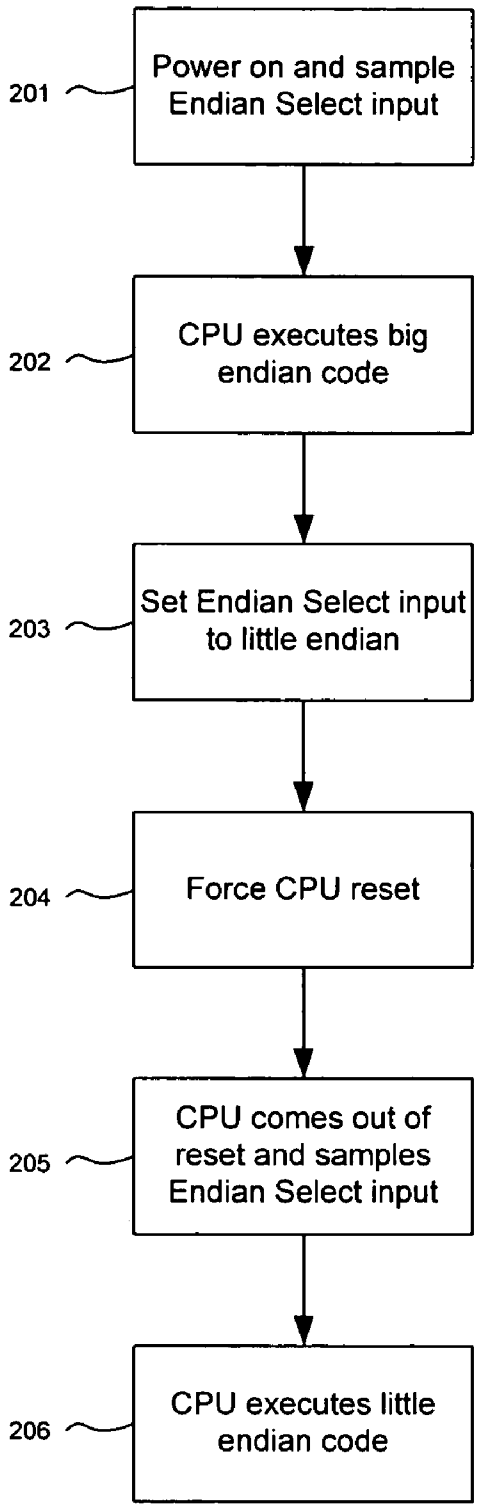
FIG. 2 is a flowchart showing illustrative steps that may be performed in accordance with aspects of the present invention.

However, by using a relatively inexpensive circuit and a small amount of instruction code, an embedded bi-endian processor in a device may be dynamically switched without needing to re-configure a jumper or open the case of the device. As shown in FIG. 1, the processor 101 may further be coupled to an endian switching circuit 103. Using the endian switching circuit 103, changing the endian-ness of the processor 103 is fairly straightforward. First, special code is loaded into a boot-up portion of memory 102, as will be discussed in further detail. Referring to FIG. 2, the processor 101 then powers up and samples its Endian Select input (step 201). Assume for the moment that the current endian mode is big endian mode, and the desired new endian mode is little endian mode. In that case, in step 201, the processor 101 senses that the current endian mode is big endian mode. Also, when the processor 101 powers up, it performs a boot sequence that includes automatically executing instructions beginning at a predetermined boot-up memory address in memory 102 (step 202). For example, upon a power-on reset, the BCM4702 chip automatically executes an instruction located at memory address 0xBFC00000. Since the special code begins at the boot-up memory address, the processor executes the first instruction in the special code upon boot up. Also, because the processor 101 is currently in big-endian mode, it will interpret the special code in big-endian mode.

When the special code is executed in big-endian mode, the special code causes the processor 101 to send a "go" signal to the endian switching circuit 103. In this embodiment, the "go" signal would be the processor 101 pulling a general-purpose input/output (GPIO) line down. However, other signals may be used. In response to the "go" signal, the endian switching circuit 103 may set an Endian Select input (e.g., the EIF_DATA<15> pin of the BCM4702 chip) of the processor 101 to the appropriate level depending upon the desired endian mode (step 203). The endian switching circuit 103 may further manipulate a power-on reset input (e.g., by pulling the \EXT_POR pin of the BCM4702 processor low) of the processor 101 to cause the processor 101 to execute a power-on reset (step 204).

When the processor 101 comes out of reset, the processor 101 re-samples its Endian Select input to determine the current endian mode (step 205). Since the endian select circuit 103 has set the Endian Select input accordingly, the processor 101 now operates in little-endian mode. Thus, when the processor 101 executes the first instruction of the same special code (step 206), the processor 101 interprets the special code in little-endian mode. In little-endian mode, the special code does not cause the processor 101 to reset, but instead allows the processor 101 to continue on with other functions.

Thus, the special code should be carefully designed to make sense in both little-endian mode and big-endian mode, and to perform appropriate functions in both modes. Tables 2 and 3 illustrate examples of how the special code may operate in each of the two endian modes. In Table 2, the original mode is big-endian mode, and the desired new mode is little-endian mode. In Table 3, the original mode is little-endian mode, and the desired new mode is big-endian mode. In both tables, the memory address START refers to the boot-up address.

TABLE 2

| Address | Big Endian Instruction | Little Endian Instruction |
|---|---|---|
| START | do nothing | jump to LE_START |
| | assert "go" signal | (don't care) |
| | (don't care) | (don't care) |

TABLE 2-continued

| Address | Big Endian Instruction | Little Endian Instruction |
|---|---|---|
| | (don't care) | (don't care) |
| | (don't care) | (don't care) |
| LE_START | (don't care) | begin little endian code |
| | (don't care) | little endian code continued |

TABLE 3

| Address | Big Endian Instruction | Little Endian Instruction |
|---|---|---|
| START | jump to BE_START | do nothing |
| | (don't care) | assert "go" signal |
| | (don't care) | (don't care) |
| | (don't care) | (don't care) |
| | (don't care) | (don't care) |
| BE_START | begin big endian code | (don't care) |
| | big endian code continued | (don't care) |

Tables 2 and 3 are a pseudo-code version of the special code. Illustrative actual implementations of the special code (in this example, based on MIPS architecture) are shown in Tables 4 and 5. In Table 4, the original mode is big-endian mode, and the desired new mode is little-endian mode. In Table 5, the original mode is little-endian mode, and the desired new mode is big-endian mode. In both tables, the memory address 0xBFC00000 is the boot-up address.

TABLE 4

| Address | Big-Endian Instruction | Little-Endian Instruction |
|---|---|---|
| BFC00000 | 14 00 00 10<br>BNE $0, $0, 0xBFC00044 | 10 00 00 14<br>BEQ $0, $0, 0xBFC00054 |
| BFC00004 | 00 00 00 00<br>NOP | 00 00 00 00<br>NOP |
| BFC00008 | (begin code to assert "go" signal) | (don't care) |
| . | (don't care) | (don't care) |
| . | (don't care) | (don't care) |
| BFC00044 | (don't care) | (don't care) |
| . | (don't care) | (don't care) |
| . | (don't care) | (don't care) |
| BFC00054 | (don't care) | (begin little-endian code) |

TABLE 5

| Address | Little-Endian Instruction | Big-Endian Instruction |
|---|---|---|
| BFC00000 | 14 00 00 10<br>BNE $0, $0, 0xBFC00044 | 10 00 00 14<br>BEQ $0, $0, 0xBFC00054 |
| BFC00004 | 00 00 00 00<br>NOP | 00 00 00 00<br>NOP |
| BFC00008 | (begin code to assert "go" signal) | (don't care) |
| . | (don't care) | (don't care) |
| . | (don't care) | (don't care) |
| BFC00044 | (don't care) | (don't care) |
| . | (don't care) | (don't care) |
| . | (don't care) | (don't care) |
| BFC00054 | (don't care) | (begin big-endian code) |

Referring to Table 4, the first instruction executed in big-endian mode at address 0xBFC00000 is effectively a no-operation instruction; if zero does not equal zero, then branch to address 0xBFC00044. Since this branch will never occur, it does not matter what is stored at 0xBFC00044. After executing another no-operation instruction (NOP) (to account for pipeline processing), the processor 101 then executes code at address BFC00008 that causes the processor 101 to assert the "go" signal. Once the processor 101 has reset and rebooted into little-endian mode in response to the "go" signal, the same code in Table 4 is then interpreted in little-endian mode. Thus, at address 0xBFC0000, the first instruction executed in little-endian mode is effectively a guaranteed branch instruction; if zero equals zero then branch to address 0xBFC00054. Thus, in one endian mode, an instruction such as the first instruction may not cause the processor 101 to branch, while in the other endian mode, the same instruction may cause the processor 101 to branch. Note that the branch/no-branch effect of the instruction may be the reverse of that shown in the above example. Also note that the little-endian instruction is simply a byte-reversed version of the big-endian instruction (i.e., 10 00 00 14 versus 14 00 00 10). At address 0xBFC00054, then little-endian instructions, as desired, are further executed. As can be seen in Table 5, a similar scheme is utilized except that the big-endian and little-endian coding is reversed.

Figure 3:
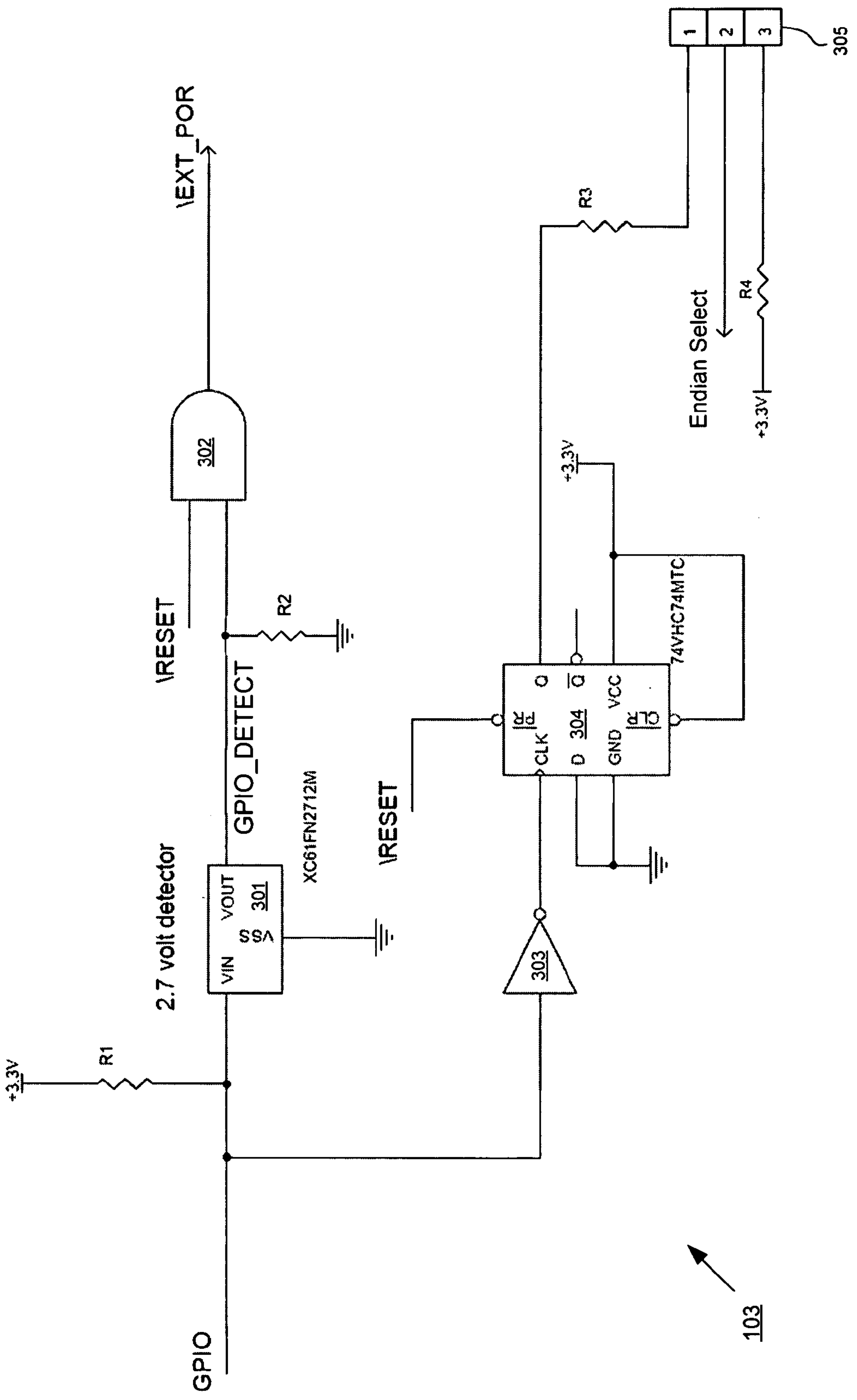
FIG. 3 is a schematic diagram of an illustrative endian select circuit in accordance with aspects of the present invention.

Referring now to FIG. 3, the endian select circuit 103 may have a voltage detector 301, such as a Torex XC61 series voltage detector with a built-in delay. The voltage detector 301 detects the voltage on the incoming GPIO line and outputs a digital signal that depends upon the voltage of the GPIO. If the voltage of the GPIO line increases to at least a threshold voltage, then the output of the voltage detector 301, i.e., the GPIO_DETECT line, goes to a first logical level (e.g., one), and otherwise the output of the voltage detector 301 is of a second logical level (e.g., zero). The input and output of the voltage detector 301 are coupled to pull-up resistor R1 and pull-down resistor R2, respectively to provide un-driven default levels. In the illustrative embodiment, the "go" signal may be the transition of the GPIO level from high to low. However, other "go" signals may be used, such as a low-to-high transition or a pulse. Also, the "go" signal may be one or more bits wide.

The endian select circuit 103 may further receive an override reset input (\RESET), which in the illustrative embodiment is active low. Because it is desirable in the present embodiment to reset the processor 101 if either the \RESET or GPIO_DETECT signals are low, these two signals may be combined using an AND gate 302. However, other types of combining logic may be used. The output of the AND gate 302 is coupled to the \EXT_POR reset pin of the processor 101.

The endian select circuit 103 may further include a storage element 304, such as a latch or flip-flop, that is triggered by the "go" signal. In the present embodiment, the storage element 304 is a D flip-flop that is clocked in accordance with the "go" signal. Since the D flip-flop in this embodiment is clocked on a positive transition, and the "go" signal is a negative transition, the "go" signal is inverted by inverter 303. The data input D of the flip-flop is tied to ground, and so responsive to the "go" signal, the output Q of the flip-flop is set to zero. The D flip-flop 304 may have a \PR input (preset) that receives the \RESET signal. A connector 305 may be coupled to the output Q via a resistor R3, and thus receive the value of Q. The resistor R3 isolates the EIF_DATA<15> pin from Q when other data is being generated by the processor 101 or by the memory 102 through the pin during normal operation.

The connector 305 may have a series of pins (in this case, three) that receive a reconfigurable jumper (not shown). Assume that the processor 101 is a BCM4702 processor chip. In that case, if the jumper connects pin 1 with pin 2, then the endian switching circuit 103 is enabled and may be used to select the endian-ness of the processor 101 as previously discussed. If the jumper connects pin 2 with pin 3, then the processor 101 would be permanently configured to operate in big-endian mode because the endian select input of the processor 101 would be tied high via resistor R4. If no jumper is used, then the processor 101 would be permanently configured to operate in little-endian mode. Notably, as long as the jumper connects pin 1 with pin 2, the jumper does not need to be moved to change the endian-ness of the processor 101. Alternatively, the output of the storage element 304 may be coupled through R3 to the endian select input of the processor 101 without the need for a jumper.

Figure 4:
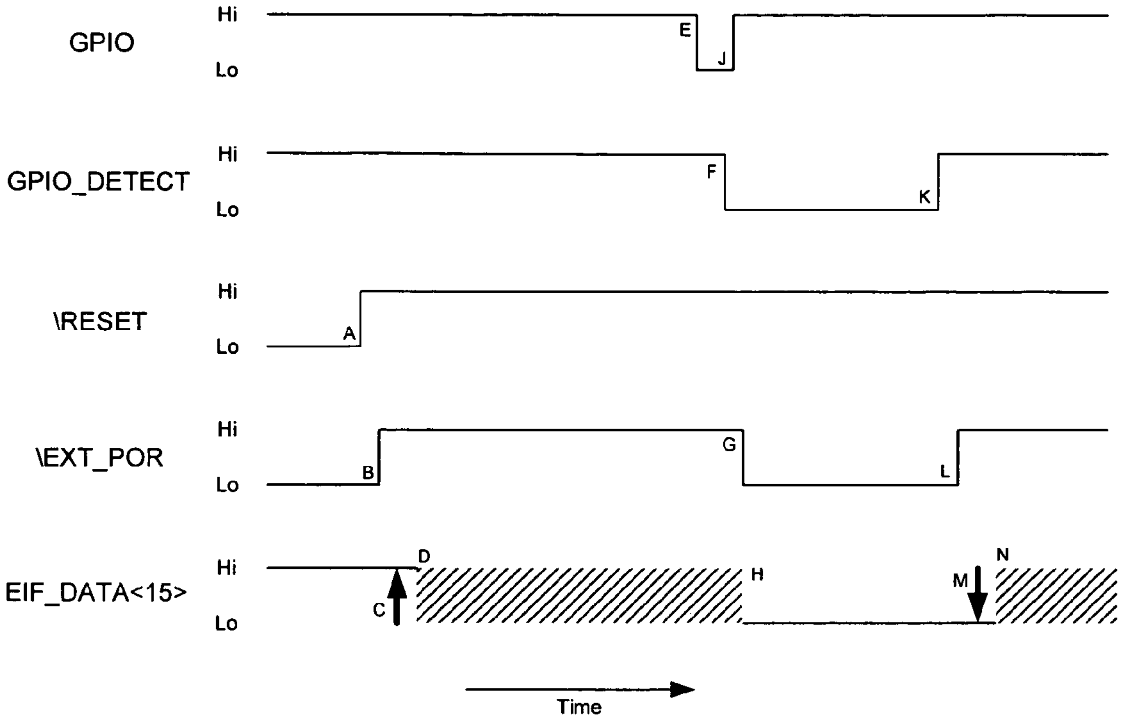
FIG. 4 is a timing diagram of the electronic circuit of FIG. 3.

FIG. 4 shows the timing of various signals in the illustrative endian select circuit 103. As shown, the GPIO, GPIO_DETECT, and EIF_DATA<15> signals may initially be high or may become high. EIF_DATA<15> is high because Q is high, and Q is high because \PR is asserted and \CLR is unasserted in the flip-flop 304. Assuming that GPIO_DETECT is now high, at time A, \RESET becomes unasserted (becomes high), thereby causing \EXT_POR to go high at time B. In response to powering up, the processor 101 samples the level of EIF_DATA<15> at time C to determine the current endian mode. Up to this point, step 201 of FIG. 2 has been performed.

Next, the big-endian code is executed (step 202) causing EIF_DATA<15> (along with the other EIF_DATA lines) to be used, starting at time D, to transfer data during normal processor operations (as indicated by diagonal lines). During this normal data transfer, EIF_DATA<15> is isolated from Q via resistor R3. The big-endian code execution also causes the GPIO line to transition to low at time E. In this embodiment, the GPIO transition is the "go" signal. In response to the transition of GPIO, GPIO_DETECT transitions to low at later time F. Also in response to the GPIO transition, the flip-flop 304 is clocked via the inverter 303, and so the output Q transitions to low (since input D is tied to ground).

Also, in response to the GPIO_DETECT transition, the \EXT_POR line transitions to low at time G. In response to the \EXT_POR transition, the processor 101 may enter power-on reset mode (step 204). During power-on reset, the processor 101 temporarily does not control either GPIO or EIF_DATA<15>, and so by default GPIO is pulled high at time J via pull-up resistor R1 and EIF_DATA<15> is controlled by Q. Since Q is low, EIF_DATA<15> also becomes low at time H, thus implementing step 203. The GPIO may be low for any amount of time. In the present embodiment, the GPIO line may be expected to remain low for about five milliseconds, and then return high. In response to the GPIO line returning high, the GPIO_DETECT line and the \EXT_POR line also go high at respective times K and L. Note that the delay time between time K and time J is larger than the delay between time F and time E. In the present embodiment, the delay between time K and time J, which is implemented by the voltage detector 301, may be about 50–200 milliseconds. Other delay values may be implemented.

At some time after time L, the processor 101 comes out of reset mode and samples the EIF_DATA<15> again at time M to determine the current endian mode (step 205). Depending upon the value of EIF_DATA<15> at time M, the processor 101 will operate in either little-endian or big-endian mode. In the present illustrative embodiment, the processor 101 would operate in little-endian mode (step 206). Thereafter, beginning at time N, EIF_DATA<15> and the other EIF_DATA pins may be used to normally transfer data.

While illustrative systems and methods as described herein embodying various aspects of the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments. Also, the invention has been defined using the appended claims, however these claims are exemplary in that the invention is intended to include the elements and steps described herein in any combination or sub-combination. It will also be appreciated and understood that modifications may be made without departing from the true spirit and scope of the invention.

What is claimed is:

1. An apparatus, comprising:

a bi-endian processor having an endian select input, the processor configured to control a first signal;

a circuit coupled to the bi-endian processor, the circuit configured to generate a second signal in response to the first signal, the endian select input of the processor being configured to receive the second signal; and a memory coupled to the processor, the memory storing a set of instructions, wherein the set of instructions are configured such that when the bi-endian processor interprets and executes the instructions in a first endian mode, the instructions cause the bi-endian processor to generate the first signal, and such that when the bi-endian processor interprets and executes the same set of instructions in a different second endian mode, the instructions do not cause the bi-endian processor to generate the first signal.

2. The apparatus of claim 1, wherein the processor includes a reset input, the circuit further configured to generate a third signal in response to the first signal, the reset input of the processor configured to receive the third signal.

3. The apparatus of claim 2, wherein the circuit is configured to generate a value of the second signal before the processor is reset, and to hold the value at least through a reset process.

4. The apparatus of claim 1, wherein the circuit is further configured to generate the second signal in response to a value of the first signal changing.

5. The apparatus of claim 1, wherein the set of instructions includes a first instruction, wherein when interpreted and executed in the first endian mode the first instruction does not cause the processor to branch, and wherein when interpreted and executed in the second endian mode the first instruction causes the processor to branch.

6. The method of claim 1, wherein the first endian mode is big-endian mode and the second endian mode is little-endian mode.

7. The method of claim 1, wherein the first endian mode is little-endian mode and the second endian mode is big-endian mode.

8. The method of claim 1, wherein the set of instructions begins at a boot-up address of the memory.

9. A method for switching an endian mode of a bi-endian processor, comprising steps of:

the bi-endian processor interpreting and executing, in a first endian mode, a set of instructions, the instructions causing the bi-endian processor to reset when executed in the first endian mode; and responsive to being reset, the bi-endian processor interpreting and executing, in a different second endian mode, the same set of instructions that will not cause the bi-endian processor to reset.

10. The method of claim 9, further including a step of, responsive to being reset, sensing at an input of the processor a signal representing the second endian mode.

11. The method of claim 9, wherein the step of the processor executing the set of instructions further causes the processor to generate a signal at an output of the processor.

12. The method of claim 9, wherein the first endian mode is big-endian mode and the second endian mode is little-endian mode.

13. The method of claim 9, wherein the first endian mode is little-endian mode and the second endian mode is big-endian mode.

14. The method of claim 9, wherein the set of instructions includes a first instruction, wherein when interpreted and executed in the first endian mode, the first instruction does not cause the processor to branch, and wherein when interpreted executed in the second endian mode, the first instruction causes the processor to branch.

15. The method of claim 9, wherein the set of instructions includes a first instruction, wherein when interpreted and executed in the first endian mode, the first instruction causes the processor to branch, and wherein when interpreted and executed in the second endian mode, the first instruction does not cause the processor to branch.

16. A bi-endian processor configured to practice the method of claim 9.

17. A device having a bi-endian processor configured to practice the method of claim 9.

18. The method of claim 9, wherein the set of instructions begins at a boot-up address.

19. The apparatus of claim 1, wherein the memory is a single memory chip.

20. The method of claim 9, wherein the set of instructions includes an instruction configured to always cause the processor to branch when the instruction is interpreted and executed by the processor in the second endian mode, and wherein the instruction is further configured to never cause the processor to branch when the instruction is interpreted and executed by the processor in the first endian mode.

* * * * *